United States Patent
Okada et al.

[11] Patent Number: 6,007,449
[45] Date of Patent: Dec. 28, 1999

[54] DIFFERENTIAL LOCKING SYSTEM OF AXLE DRIVING APPARATUS

[75] Inventors: Hideaki Okada; Hirohiko Kawada, both of Amagasaki, Japan

[73] Assignee: Kanzaki Kokyukoki Mfg. Co., Ltd., Japan

[21] Appl. No.: 09/065,682

[22] Filed: Apr. 24, 1998

[51] Int. Cl.[6] ............................................. F16H 48/06
[52] U.S. Cl. .......................... 475/231; 475/234; 74/650
[58] Field of Search ................................. 475/230, 231, 475/233, 237; 74/607, 650

[56] References Cited

U.S. PATENT DOCUMENTS

| | | | |
|---|---|---|---|
| 4,703,671 | 11/1987 | Jikihara | 475/231 |
| 5,673,777 | 10/1997 | Ziech | 475/237 |
| 5,709,135 | 1/1998 | Baxter | 74/607 |
| 5,715,733 | 2/1998 | Dissett | 74/650 |

*Primary Examiner*—Charles A Marmor
*Assistant Examiner*—Tisha D. Waddell
*Attorney, Agent, or Firm*—Sterne, Kessler, Goldstein & Fox P.L.L.C.

[57] ABSTRACT

A differential locking system of an axle driving apparatus wherein left and right axles are rotatably supported within a housing consisting of an upper half housing and a lower half housing. The inner ends of the axles are facing each other and are rotatably inserted within a differential input gear. An engaged plate member is disposed at the right of the differential input gear. Engaged recesses of the differential input gear and engaged recesses of the engaged plate member are connected with each other. A pair of differential pinions are pivoted within the differential input gear, perpendicular to the axles. Both sides of each differential pinion are engaged with differential side gears fixed around the right and left axles, respectively. Pin passing holes are bored in the right differential side gear. A thrust collar is disposed on the right axle outside of the right differential side gear. A shifter fixing the differential locking pins is axially slidably disposed around the thrust collar. The differential locking pins pass through the corresponding pin passing holes and can be inserted into and removed from engaged recesses of the differential input gear and the engaged plate member. A shift fork holds the shifter horizontally and rotatably engages at the upper end thereof with an upper half housing and at the lower end thereof with a lower half housing. A differential locking arm is attached to the bottom surface of the lower half housing so as to rotate the shift fork.

7 Claims, 8 Drawing Sheets

DIFFERENTIAL LOCKING SYSTEM OF AXLE DRIVING APPARATUS

BACKGROUND OF THE INVENTION

1. Field of the Invention

The present invention relates to an axle driving apparatus contained in a housing comprising a hydrostatic transmission ("HST"), axles, and a transmitting mechanism connecting the HST to the axles. Specifically, a differential locking system is provided on a differential gear unit of the transmitting mechanism for the axles.

2. Description of the Related Art

An axle driving apparatus contained in a housing, comprising an HST, axles and a transmitting mechanism connecting the HST and the axles with each other is well-known. The transmitting mechanism of such an axle driving apparatus includes a differential gear unit for differentially rotating the left and right axles. The differential gear unit may include a differential locking system restricting the differential rotation of the axles so as to enable a vehicle having the axle driving apparatus to travel easily on soft terrain.

The conventional differential locking system is constructed such that a differential casing, which includes differential pinions and differential side gears fixed to a differential input gear (a ring gear), engages with one of the left and right axles, thereby making the axles rotate integrally. A conventional differential locking system comprises a shifter, which is not relatively rotatable and is axially slidably disposed around the axle and can engage with the differential casing, and an arm, which is rotatably disposed at the outside of the housing of the axle driving apparatus. When the arm is rotated by means of a differential locking operational tool like a lever or a pedal, the shifter slides on the axle so that the differential casing engages with or disengages from the axle.

In such a construction of a conventional differential locking system, the differential casing requires a large space and is necessarily located apart from the differential input gear, thereby expanding the housing size. Modifying such a construction such that the differential input gear and one of the left and right axles engages with each other through pins or the like, without the differential casing, causes the differential input gear to lean at heavy loads due to insufficient supporting strength. Accordingly, the toothed portion of the differential input gear generates eccentric friction, thereby reducing the durability and longevity of the differential gear unit. Thus, a compact differential locking system made without a differential casing which still prevents leaning of the differential input gear is desired.

Furthermore, in a conventionally constructed differential locking system, the arm which interlocks with the shifter includes a rotary shaft, which rotates together with the arm, disposed in the housing. A changing mechanism is therefore required which changes the rotation of the rotary shaft into the sliding movement of the shifter. The changing mechanism comprises, for example, a cam means, which is complicated and increases the number of pans required. Thus, it is desirable to simplify the changing mechanism and to enable the shifter to be shifted steadily.

Also, it is desirable to dispose the arm interlocking with a pedal or a lever at the circumference of the housing such that it does not interfere with the members of the HST which project from or into the housing, such as the input shaft and speed changing shaft.

SUMMARY OF THE INVENTION

An object of the present invention is to construct an axle driving apparatus including a differential gear unit provided with a compact differential locking system, which is durable for heavy tracting work despite being constructed without a differential casing.

A second object of the present invention is to improve the durability of an expensive differential input gear of such a construction without reinforcement of itself.

A third object of the present invention is to simplify a shifter operating mechanism of such a differential locking system.

A fourth object of the present invention is to dispose such a simplified shifter operating mechanism, a differential locking arm and a mechanism interlocking with it at the circumference of the housing, so as to prevent interference with other members.

Other and further objects, features and advantages of the invention will appear more fully from the following description.

DETAILED DESCRIPTION OF THE PREFERRED EMBODIMENTS

At first, explanation will be given on the entire construction of an axle driving apparatus of the present invention in accordance with FIGS. 1 and 2.

A housing comprising of upper half housing 1 and a lower half housing 2 are joined to each other along a horizontal joint surface. The housing is separated by partitions 1a and 2a into a first chamber C1 containing an hydrostatic transmission ("HST") and a second chamber C2 containing a differential gear unit. Axle casing portions are formed at left and right sides of second chamber C2 and journal left and right axles, respectively.

Additionally, a chamber C2' is formed by extending second chamber C2 at the lateral side of first chamber C1. Chamber C2' contains a gear line between a motor shaft 9 of the HST disposed in first chamber C1 and the differential gear unit. Chamber C2' is separated from first chamber C1 by partitions 1a and 2a.

The construction of the HST in first chamber C1 will now be explained. A center section 3 is disposed in first chamber C1. A horizontal pump mounting surface 3a is formed on an upper surface of center section 3. A vertical motor surface 3b is formed a side surface of center section 3. A hydraulic pump 4, including a vertical pump shaft 5, is mounted on pump mounting surface 3a. An upper portion of pump shaft 5 projects upwardly from upper half housing 1 so as to form a power input shaft. An input pulley 6 and a cooling fan 7 are fixed onto the upper projecting portion of pump shaft 5. Turning to motor mounting surface 3b, a hydraulic motor 8 including a horizontal motor shaft 9 is mounted thereon. Oil passages are formed within center section 3 which connect oil ports of hydraulic pump 4 and hydraulic motor 8 with each other so that hydraulic pump 4 and hydraulic motor 8 are fluidly connected with each other so as to construct an HST.

A speed changing shaft 30, which interlocks with a moveable swash plate 4a of hydraulic pump 4, is disposed in first chamber C1 and projects outwardly from a side surface of the housing. A speed changing arm 31 is fixed onto the utmost end of speed changing shaft 30. Movable swash plate 4a of hydraulic pump 4 is slanted by rotational operation of speed changing arm 31 and shaft 30, so as to set a volume of operating oil discharged from hydraulic pump 4 to hydraulic motor 8.

A neutral biasing spring 32 wound around speed changing shaft 30 biases movable swash plate 4a toward the neutral position thereof. Accordingly, when an operating force onto speed changing arm 31 is loosened, movable swash plate 4a naturally returns to the neutral position thereof, so as to smoothly stop motor shaft 9. An adjusting shaft 33 adjusts movable swash plate 4a to the correct neutral position.

Next, the construction of the axles and differential gear unit in second chamber C2 and the gear train in chamber C2' will be explained. Left and right axles 10L and 10R are laterally disposed within second chamber C2 and rotatably supported by left and right sides of second chamber C2. Differential side gears 14L, and 14R are fixed respectively onto left and right axles 10L and 10R and are adjacent to the inner ends thereof. Differential side gears 14L, and 14R engage with each other through a pair of differential pinions 13 pivoted within differential input gear 11. A shifter 17 is axially slidably disposed around right axle 10R through a thrust collar 16. Differential locking pins 15, which are fixed to shifter 17, slidably pass through right differential side gear 14R and face a side surface of differential input gear 11, so as to engage with and disengage from differential input gear 11 according to the slide of shifter 17.

Second chamber C2 expands forwardly so as to form chamber C2'. The gear train between motor shaft 9 and differential input gear 11 is disposed in chamber C2'. Motor shaft 9 is rotatably supported by partitions 1a and 2a or one of them, which separate chamber C2' from first chamber C1, and the utmost end of motor shaft 9 projects into chamber C2'. In chamber C2', a counter shaft 26 is horizontally disposed between motor shaft 9 and axles 10L and 10R. Counter shaft 26 is supported by partitions 1a and 2a and the outer wall of upper and lower half housings 1 and 2. A long second counter gear 29 is freely disposed onto counter shaft 26 and a first counter gear 28 engages with a side periphery of second counter gear 29. A motor output gear 27 is fixed onto the utmost end of motor shaft 9. Motor output gear 27 engages with first counter gear 28, and second counter gear 29 engages with differential input gear 11, so as to construct the gear train in chamber C2'.

Next the construction of the differential gear unit and the differential locking system will be explained in accordance with FIGS. 1–8. Differential input gear 11 is made of sintered alloys. Differential input gear 11 engages with and disengages from differential locking pins 15. Thus, when differential locking pins 15 are engaged with differential input gear 11 and differential input gear 11 rotates, the engaged portions thereof generate stresses causing damage. A conventional differential input gear, which is also made of sintered alloys, is reinforced by a differential casing fixed thereto, which absorbs stresses caused by the differential locking system.

If the engaged portions were strengthened by sintering alloys, differential input gear 11 would be expensive. Therefore, an engaged plate member 12 is utilized. Engaged plate member 12 is a metal, preferably steel, plate, which is harder than differential input gear 11 so as to have sufficient strength to absorb the stresses generated as described above. Engaged plate member 12 is inserted into a recessed portion at a side surface of differential input gear 11 and is not relatively rotatably fixed thereto.

Figure 3:
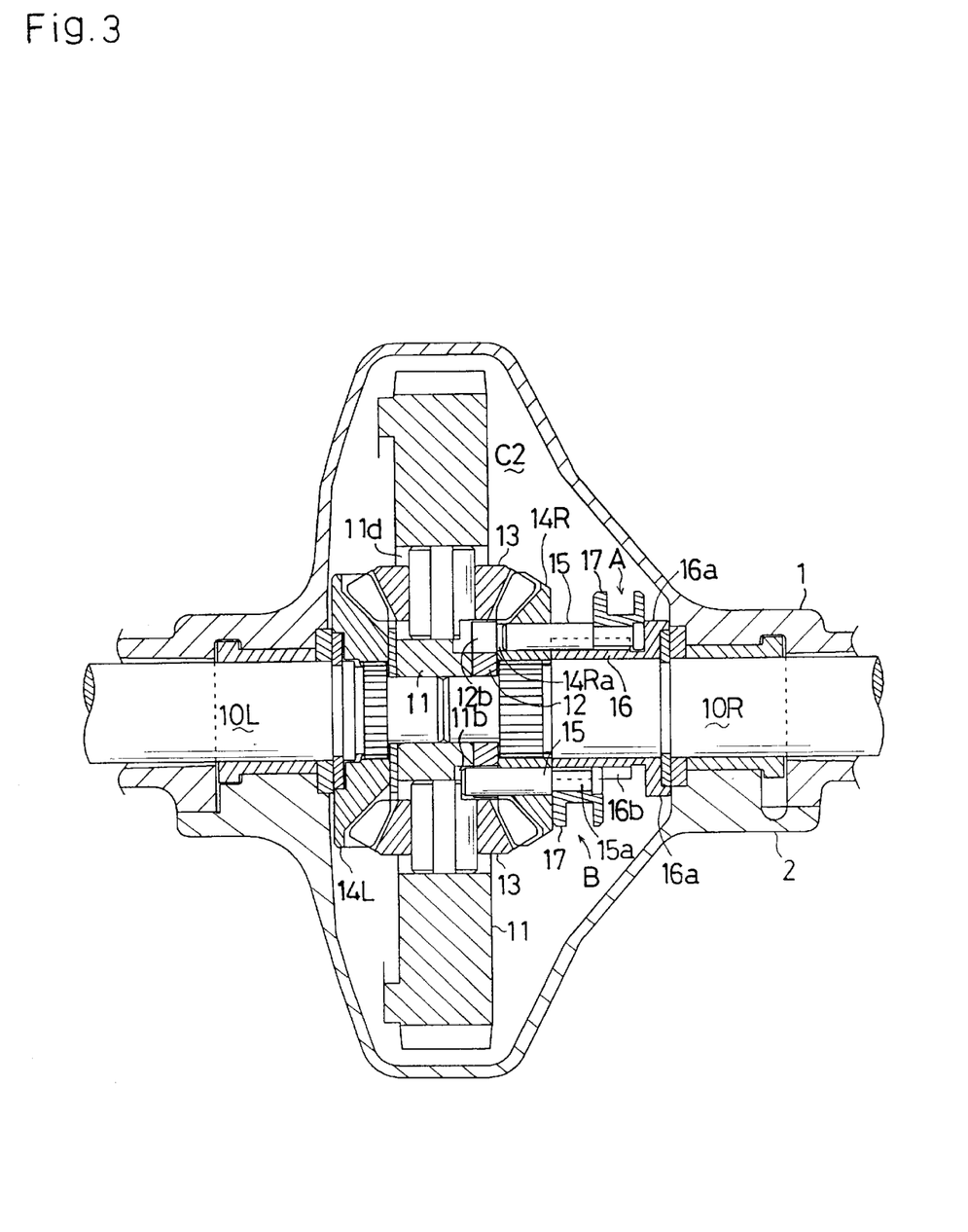
FIG. 3 is a rear sectional view of a differential gear unit disposed in the axle driving apparatus.
Figure 4:
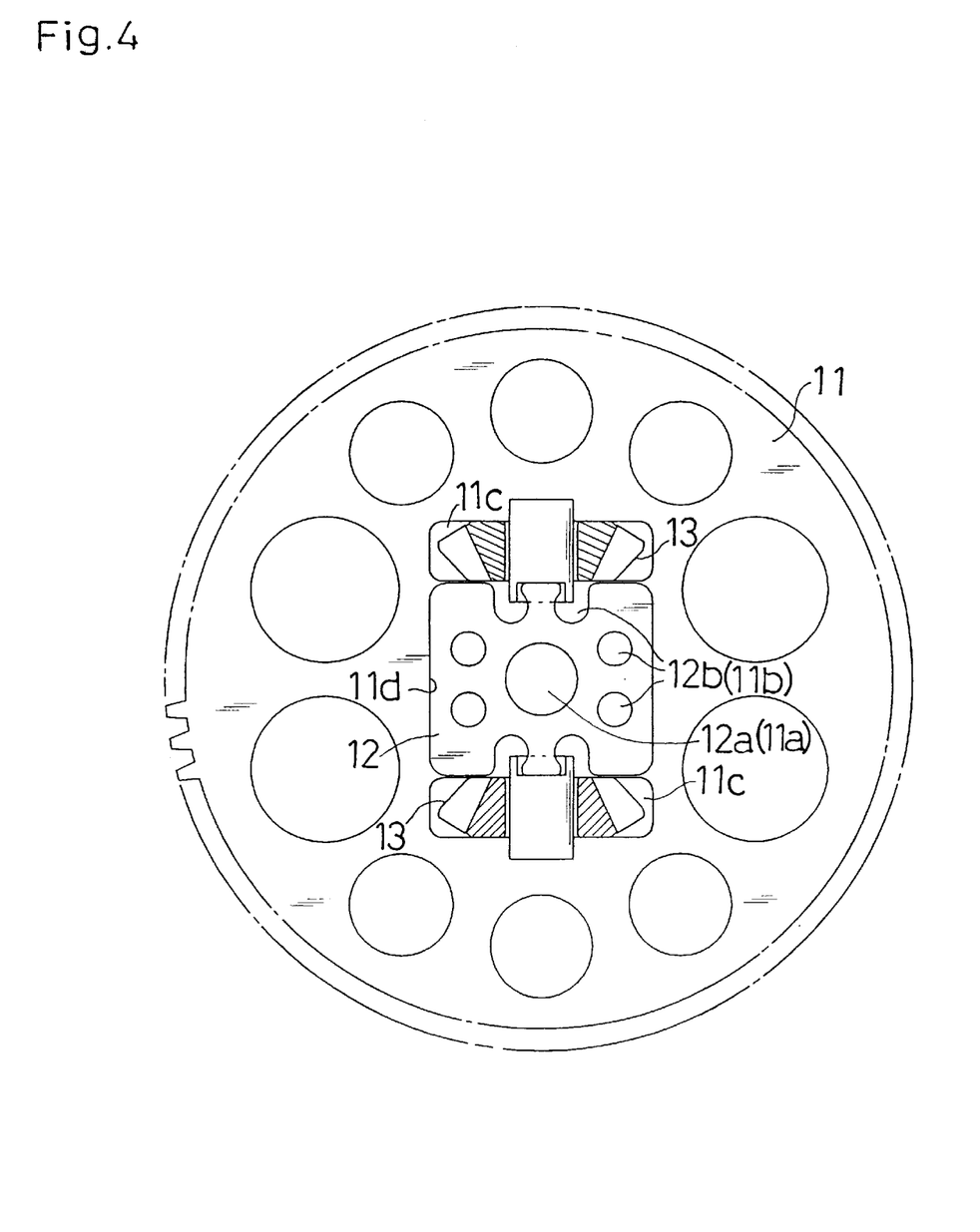
FIG. 4 is a right side view of a differential input gear.

The construction of differential input gear 11 and engaged plate member 12 is best seen in FIGS. 3 and 4. An axle hole 11a is bored through the center portion of differential input gear 11, so that the inner end portions of axles 10L and 10R facing each other are rotatably inserted thereinto.

Engaged recesses 11b are bored at regular intervals in the portion of differential input gear 11 surrounding axle hole 11a, corresponding to the location of differential locking pins 15. The utmost ends of differential locking pins 15 project into engaged recesses 11b. Also, as shown in FIG. 4, the right side surface of the portion of differential input gear 11, wherein axle hole 11a and engaged recesses 11b are bored, forms a recessed portion 11d. Engaged plate member 12 is fixedly inserted into recessed portion 11d. An axle hole 12a is bored through the center portion of engaged plate member 12 and is connected with axle hole 11a. Bored engaged recesses 12b are located in the portion of engaged plate member 12 surrounding axle hole 12a and are connected, respectively, with engaged recesses 11b, at regular intervals.

Differential pinion holes 11c are bored through two portions of differential input gear 11 surrounding axle holes 11a and 12a on opposite sides of engaged plate member 12. A pair of differential pinions 13 are rotatably supported respectively within differential pinion holes 11c.

According to the construction described above, engaged plate member 12 is separately disposed only at the portion of differential input gear 11 which requires reinforcement. Therefore, the entire differential input gear 11 does not have to be strengthened and can be produced at low cost.

As shown in FIG. 3, right differential side gear 14R fixed onto right axle 10R is adjacent to the right side of engaged plate member 12. Pin passing holes 14Ra are bored through right differential side gear 14R at regular intervals in the periphery of right axle 10R centering right differential side gear 14R. Differential locking pins 15 slidably pass through corresponding pin passing holes 14Ra. The utmost end of each differential locking pin 15 first engages with each engaged recess 12b and secondly engages with each engaged recess 11b. Thus, in the differential locking system of this embodiment, a differential casing for covering the outside of right differential side gear 14R is not provided. Differential locking pins 15 pass through within right differential side gear 14R, so that the circumference of right differential side gear 14R is reduced, thereby enabling a more compact housing portion containing the differential gear unit.

Next, an operational mechanism for sliding differential locking pins 15 will be explained. As best seen in FIG. 3, a thrust collar 16 is disposed around right axle 10R at the outside of right differential side gear 14R. The outside end of thrust collar 16 forms a flange portion 16a, which abuts against a right side wall of second chamber C2 and receives thrust force generated from the differential gear unit. Flange 16a is also used as a stopper for stopping shifter 17 when sliding outwardly.

Figure 5:
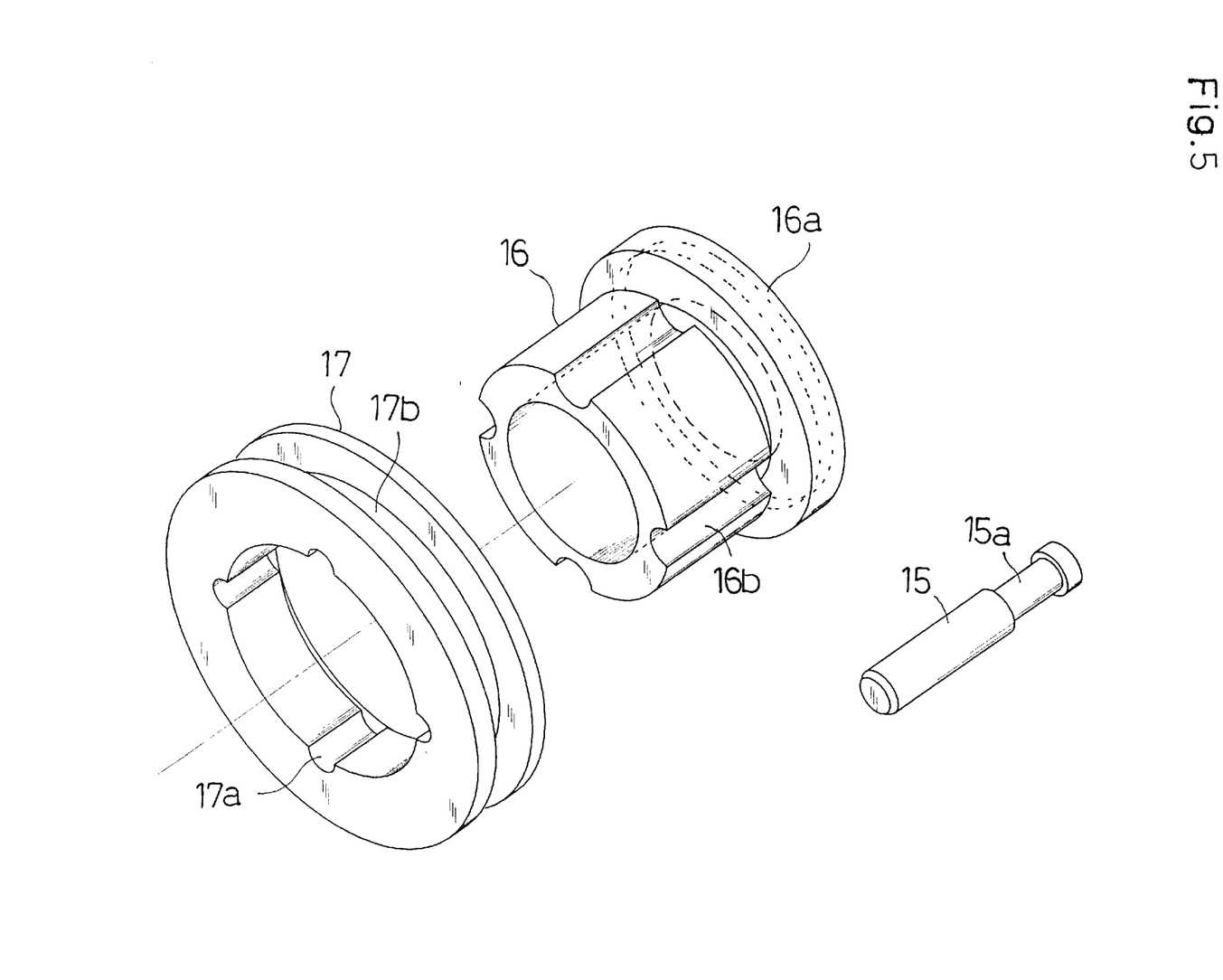
FIG. 5 is an exploded view in perspective of an engaging pin, a collar and a shifter as they appear during assembly thereof.

Semicircular recessed grooves 16b are formed at regular intervals around the outside surface of thrust collar 16 (as best shown in FIG. 5). The half portion of each differential locking pin 15 toward right axle 10R is slidably inserted into each recessed groove 16b. Shifter 17 is disposed around thrust collar 16 and such inserted differential locking pins 15. Pin fixing grooves 17a are formed on the inside surface of shifter 17. Small diametric portions 15a of differential locking pins 15 are fixedly inserted into corresponding pin fixing grooves 17a. Thus, shifter 17 and differential locking pins 15, integral with shift, 17, are axially slidably disposed on the outside surface of thrust collar 16.

Figure 1:
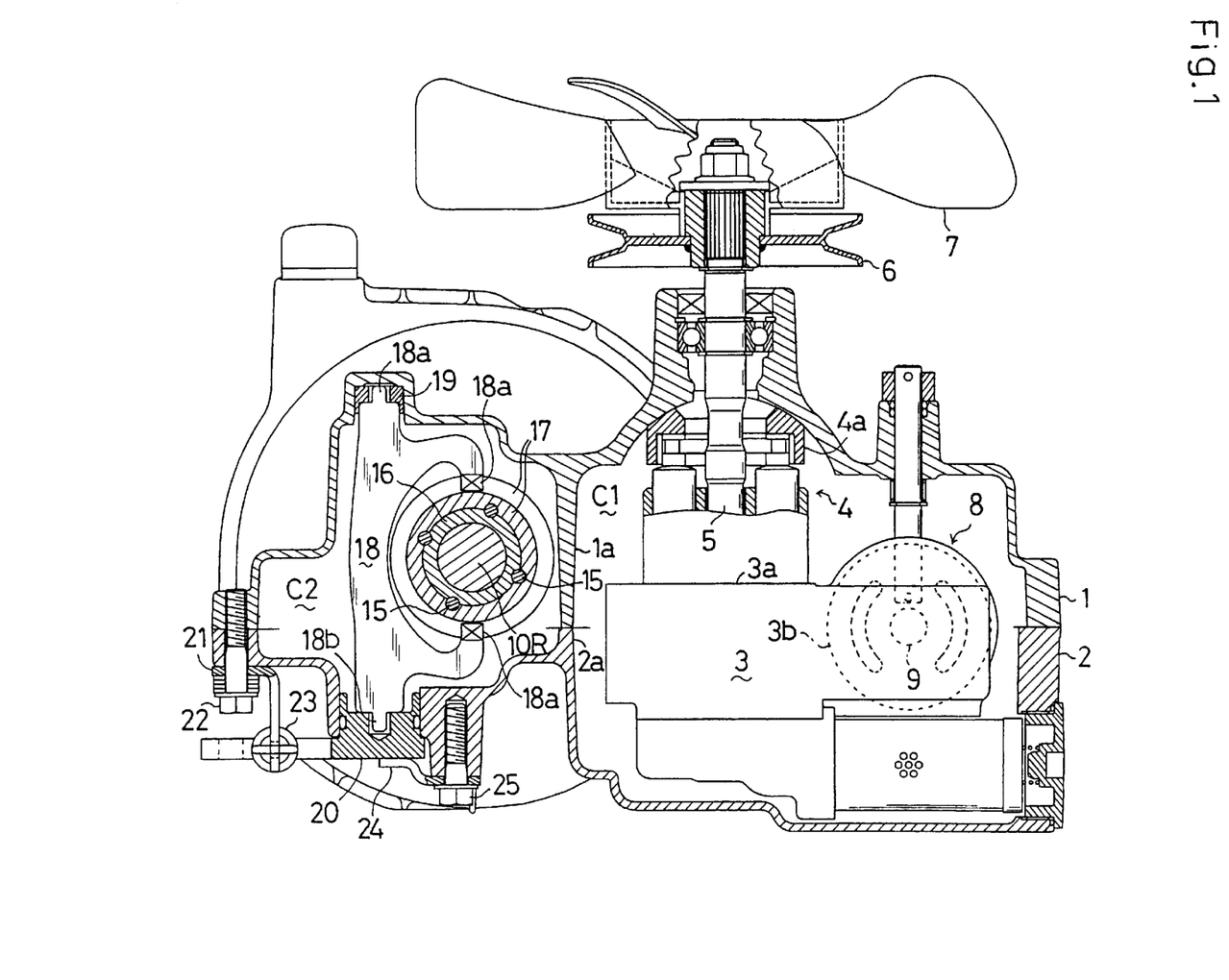
FIG. 1 is a right side view of an axle driving apparatus of the present invention.
Figure 6:
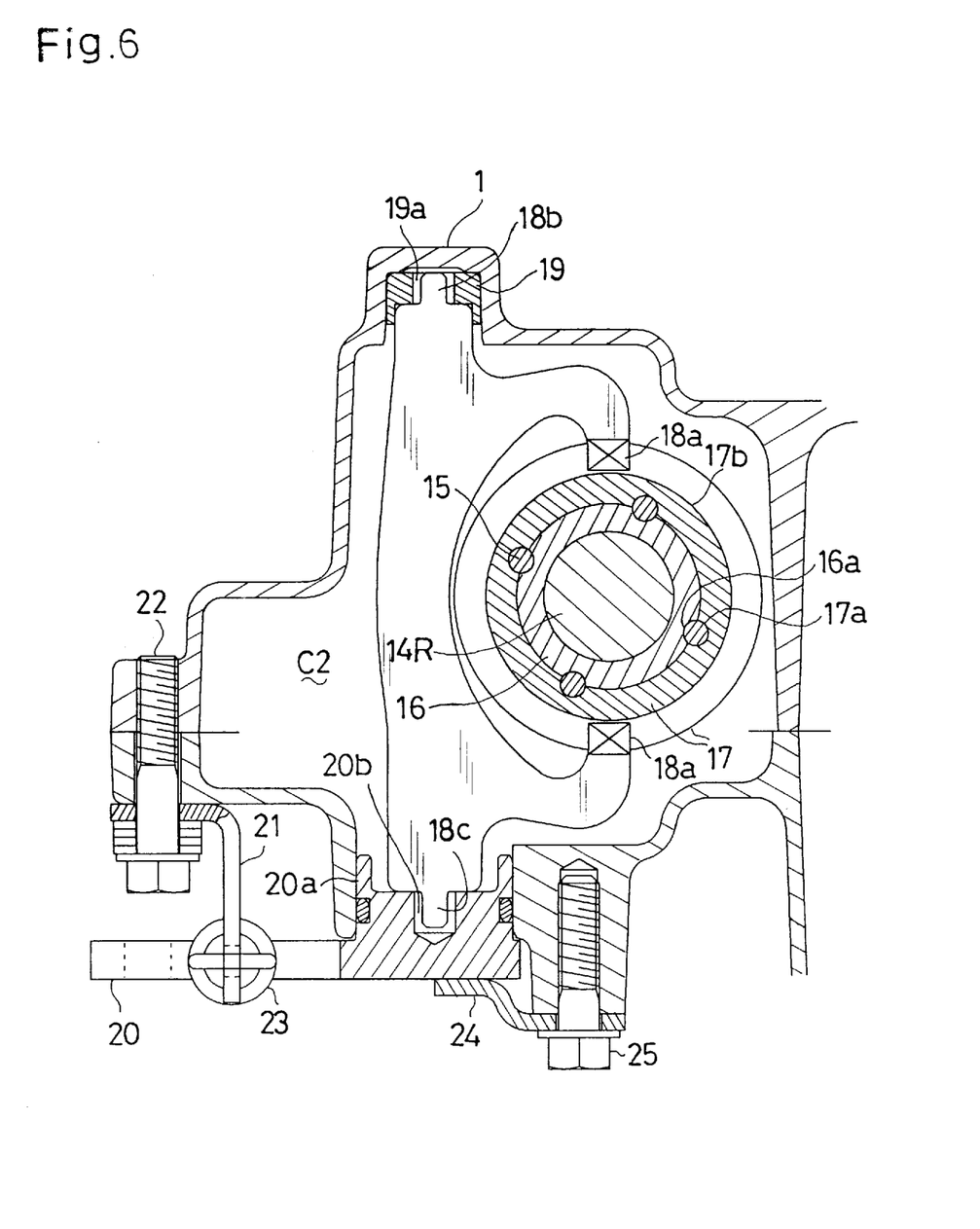
FIG. 6 is a side sectional view showing a shifter and a fork disposed in the housing.
Figure 7:
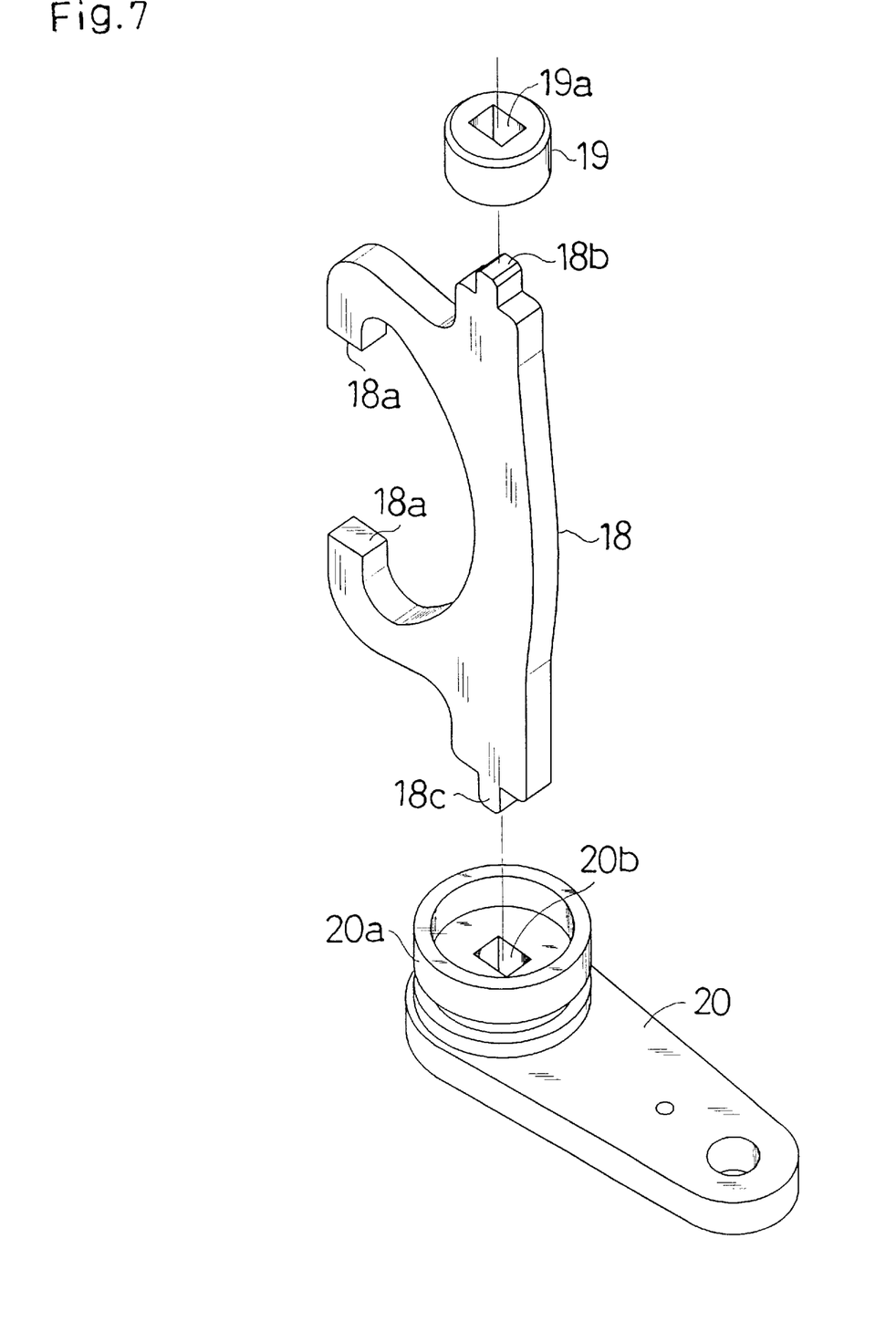
FIG. 7 is an exploded view in perspective of a fork, a support cap and a differential locking arm as they appear during assembly thereof.

As shown in FIGS. 1, 6, 7 and others, a pair of engaging portions 18a of a steel metal shift fork 18 engage with a fork groove 17b formed on the periphery of shifter 17. An upper end arm portion or stub 18b of shift fork 18 is not relatively rotatably inserted into an engaged hole 19a of a support cap 19. Support cap 19 is rotatably disposed in a cylindrical portion formed at the upper wall portion of second chamber C2 within upper half housing 1.

Additionally, a support cap portion 20a is formed at a basic end portion of a differential locking arm 20. Support cap portion 20a is not relatively rotatably inserted into a cylindrical portion formed at the bottom wall of lower half housing 2. A lower end arm portion 18c of shift fork 18 is inserted into a hole 20b of support cap portion 20a.

Thus, shift fork 18, disposed in second chamber C2, is rotatable around an imaginary axis connecting the upper and lower end portions 18b and 18c. According to the rotation of shift fork 18, shifter 17 and differential locking pins 15 fixed thereto slide in recessed grooves 16b of thrust collar 16.

As best seen in FIGS. 1 and 6, a pressure plate 24 is fixed to the outer bottom wall of lower half housing 2 through a bolt 25. Pressure plate 24 abuts against a lower surface of differential locking arm 20, so that differential locking arm 20 is stopped from moving downwardly, but support cap portion 20a is allowed to rotate. Furthermore, a spring retainer 21 is fixed onto the outer bottom wall of lower half housing 2 through an attachment bolt 22. A return spring 23 is interposed between differential locking arm 20 and spring retainer 21. Return spring 23 biases differential locking arm 20 toward a position A' as shown in FIG. 8.

Figure 2:
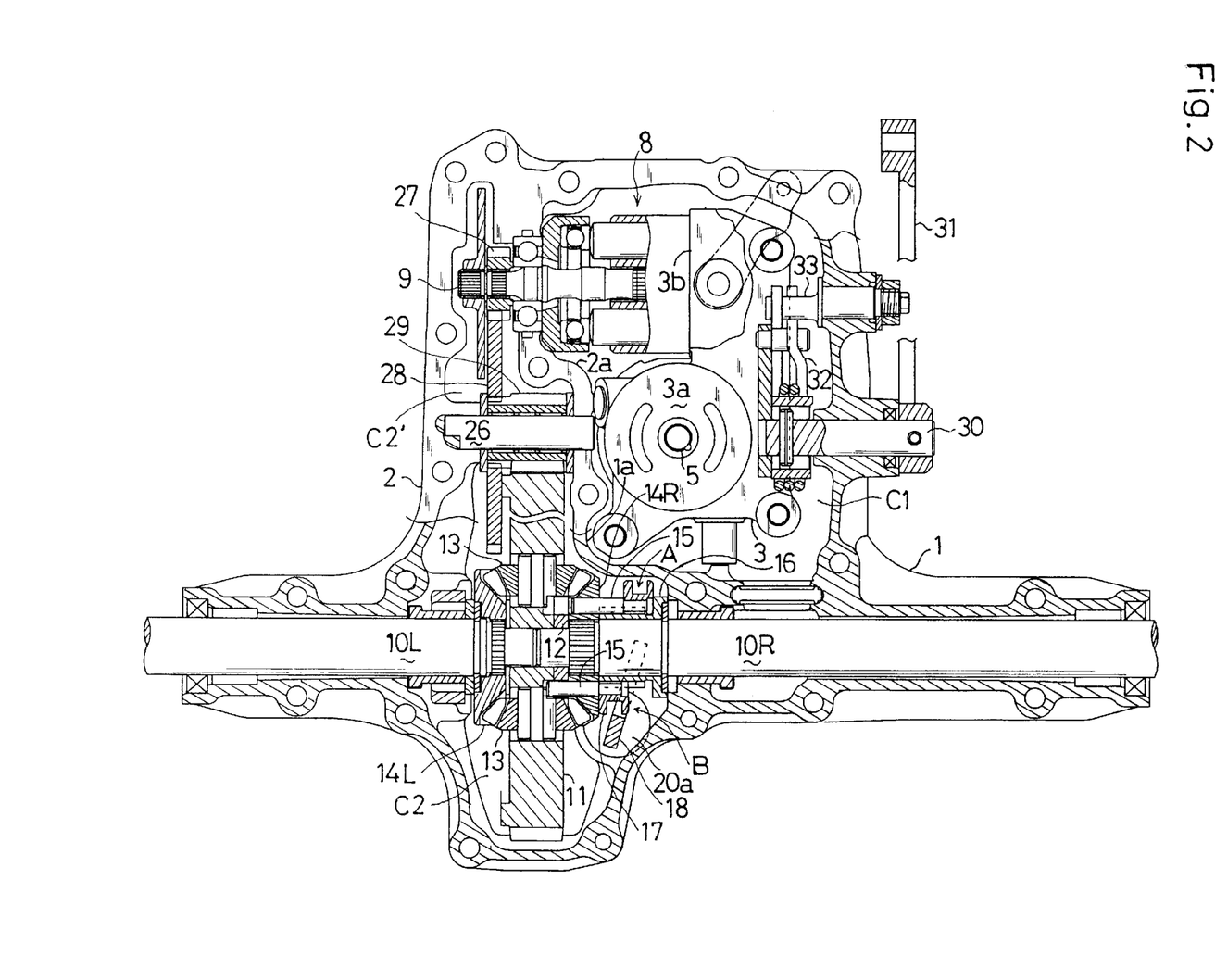
FIG. 2 is a plan view partly in section of the same when an upper half housing is removed.

When differential locking arm 20 is at the position A', shifter 17 is positioned at an outer end sliding position A and abuts against flange portion 16a of thrust collar 16 as shown in FIGS. 2 and 3. Differential locking pins 15 are removed from the corresponding engaged recesses 12b of engaged plate member 12. Accordingly, left and right axles 10L and 10R are differentially driven.

Figure 8:
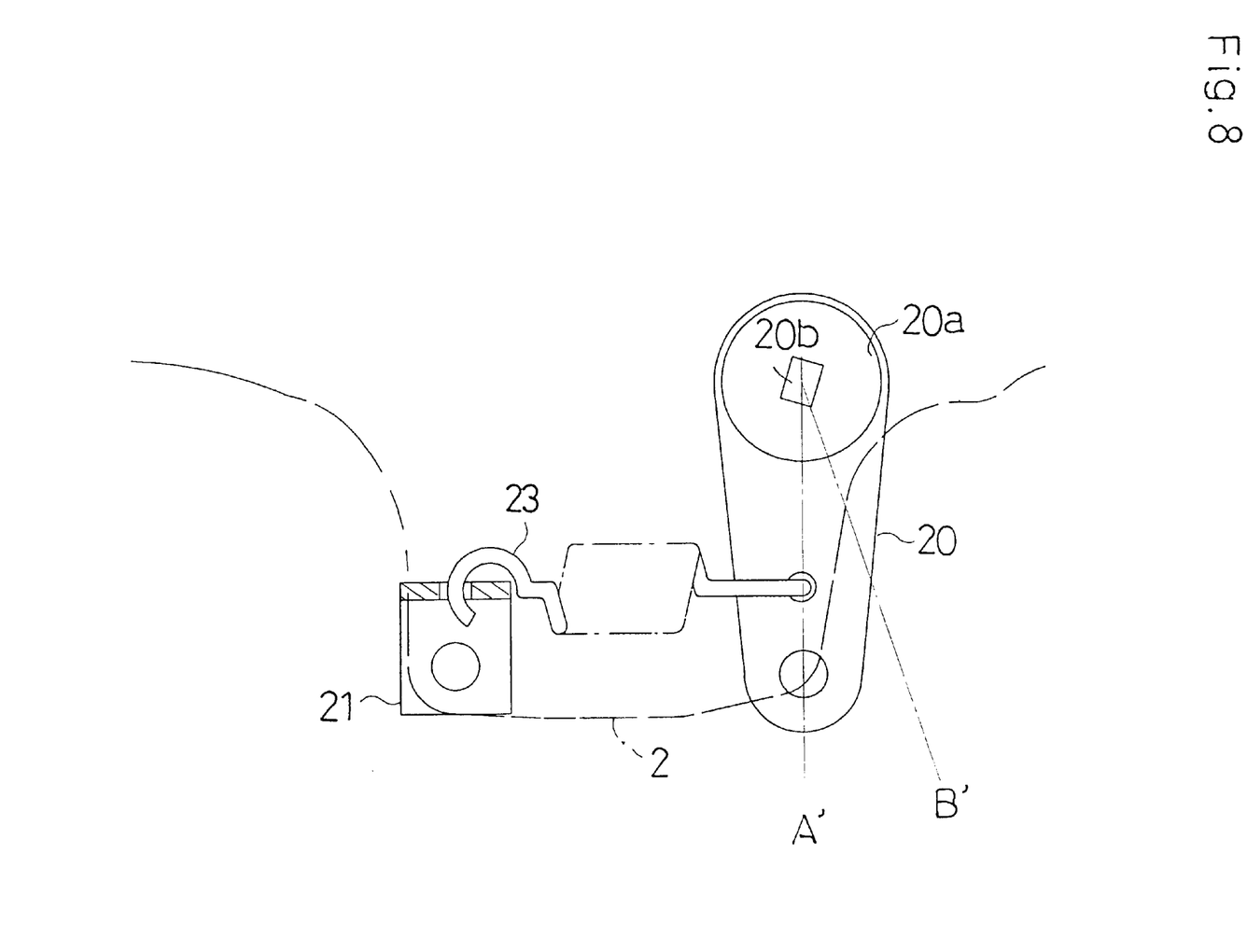
FIG. 8 is a bottom view of the portion where a differential locking arm is disposed.

When differential locking arm 20 is in rotational operation against the biasing force of return spring 23 and is disposed at a position B' as shown in FIG. 8, shifter 17 is positioned at an inner end sliding position B and abuts against right differential side gear 14R as shown in FIGS. 2 and 3. Differential locking pins 15 are inserted into corresponding engaged recesses 12b of engaged plate member 12. Accordingly, a differential locking is exerted, so that left arid right axles 10L and 10R are integrally driven.

In a conventional differential locking system, a fork is constructed so as to slide along an axis of an axle and a conventional differential locking arm is attached to an end of a rotary shaft adjacent to the fork, thereby requiring a mechanism for changing rotational movement of the rotary shaft into a sliding movement of the fork. Conversely, according to the present invention, shift fork 18 itself rotates, so as to move engaging portions 18a thereof engaged with shifter 17 along the axis of right axle 14R. Thus, such mechanism for changing rotational movement into a sliding movement is unnecessary, thereby simplifying the differential locking system and reducing the number of required parts.

Also, according to the present invention, rotational movement of differential locking arm 20 is caused by operation of a pedal or a lever of a vehicle disposed at the bottom of the housing, thereby preventing differential locking arm 20 and the mechanisms interlocking therewith from interfering with various members which project upwardly and sidewardly from the housing. Thus, when the axle driving apparatus is mounted on a vehicle, spaces for differential locking arm 20 and the mechanisms interlocking therewith do not have to be considered, thereby allowing more free space for the axle driving apparatus. There is ordinarily sufficient space for differential locking arm 20 below the housing. As a result, the axle driving apparatus can be compact and appears neat in that differential locking arm 20 is inconspicuously disposed.

While one embodiment of the present invention has been shown and described, the invention should not be limited to the specific construction thereof, and is meant to be merely exemplary.

What is claimed is:

1. An axle driving apparatus comprising:
   a pair of axles;
   a differential gear unit differentially connecting said pair of axles with each other;
   a housing containing said pair of axles and said differential gear unit, wherein said housing consists of two housings joined with each other so as to be separable by a plane parallel to a longitudinal axis of said axles;
   a differential locking system for connecting said pair of axles with each other;
   a shift fork for differential locking operation of said differential locking system which is provided with a pair of arm portions extending along an axis perpendicular to said longitudinal axis of said axles;
   support portions disposed respectively in each of said housings so as to rotatably retain said arm portions of said shift fork such that said arm portions are rotatable around said axis perpendicular to said longitudinal axis of said axles, wherein at least one of said pair of arm portions of said shift fork passes through one of said support portions and projects outwardly from said housing; and
   a differential locking arm attached to said one of said pair of arm portions of said shift fork which projects outwardly from said housing.

2. An axle driving apparatus according to claim 1, wherein said differential locking arm is disposed below said housing.

3. An axle driving apparatus comprising:
   a pair of axles;
   a differential gear unit differentially connecting said pair of axles with each other;
   a housing containing said pair of axles and said differential gear unit;

a differential locking system for connecting said pair of axles with each other, wherein said differential locking system is provided with a slider member for differential locking operation of said differential locking system; and a thrust collar disposed around one of said pair of axles and interposed between said differential gear unit and said housing so as to receive thrust force generated from said differential gear unit, wherein said slider member is disposed around an outer surface of said thrust collar and is interposed between said differential gear unit and said housing, so as to be slidable along a longitudinal axis of said axle.

4. An axle driving apparatus comprising:

a pair of axles;

a differential gear unit differentially connecting said pair of axles with each other;

a housing containing said pair of axles and said differential gear unit;

a differential locking system for connecting said pair of axles with each other, wherein said differential locking system is provided with a slider member having an engaging member, which engages with said differential gear unit so as to exert differential locking operation along a longitudinal axis of said pair of axles;

a thrust collar disposed around one of said pair of axis and interposed between said differential gear unit and said housing so as to receive thrust force generated from said differential gear unit, wherein said slider member is disposed around an outer surface of said thrust collar so as to be slidable along a longitudinal axis of said axle, and wherein corresponding recessed grooves are formed on an inside surface of said slider member and an outside surface of said thrust collar along said longitudinal axis of said axle, and wherein said engaging member is interposed between said recessed grooves so that said engaging member is slidably guided along said longitudinal axis of said axle and is not relatively rotatably attached to said slider member.

5. An axle driving apparatus comprising:

a pair of axles;

a differential gear unit differentially connecting said pair of axles with each other, wherein said differential gear unit includes a differential input gear;

a differential pinion supported in said differential input gear so as to be rotatable around an axis perpendicular to a longitudinal axis of said axles; and a pair of differential side gears disposed at opposite sides of said differential input gear so as to engage with said differential pinion and engage respectively with said axles;

a differential locking system for connecting said pair of axles with each other, wherein said differential locking system includes a slider member disposed substantially perpendicular to said differential input gear adjacent to one of said differential side gears so as to be slidable along said longitudinal axis of said axles, and an engaging member fixed to said slider member, wherein an utmost end of said slider member projects from a side surface of said slider member and passes through said one of said differential side gears so as to face a side surface of said differential input gear; and a plate member not relatively rotatably attached to said side surface of said differential input gear, wherein said plate member is provided with an engaged recess, which has a diameter so as to enable said utmost end of said slider member to be inserted therein.

6. An axle driving apparatus according to claim 5, wherein said plate member is made of metal material which is harder than said differential input gear.

7. An axle driving apparatus according to claim 5, wherein said plate member is separably attached to said differential input gear.

* * * * *